March 20, 1945.  L. D. ISAACSON  2,371,999
DEVICE FOR CREATING, TESTING, AND MEASURING STEREOPSIS
Filed July 20, 1943
Fig. 1a 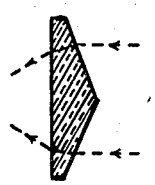  Fig. 1b   Fig. 1c 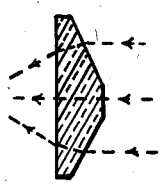  Fig. 1d 
Fig. 2
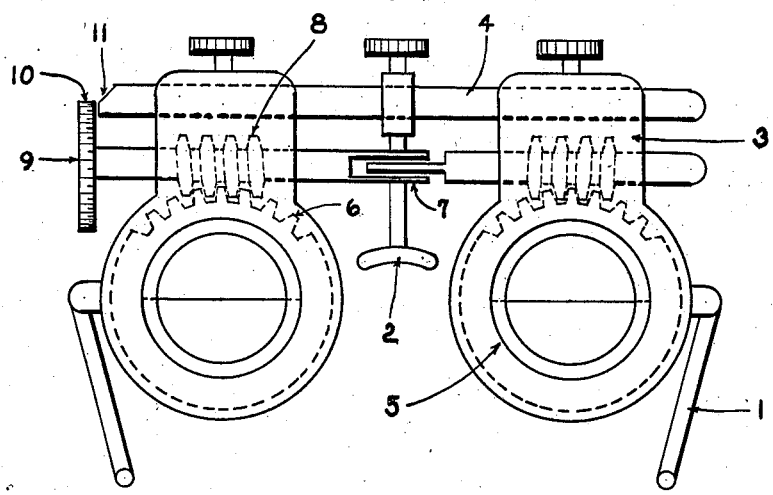
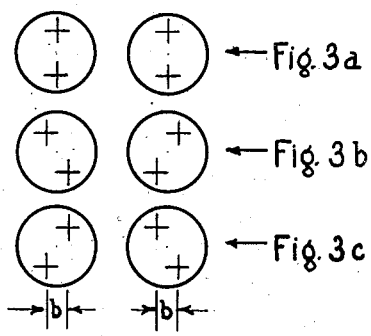 ← Fig. 3a
← Fig. 3b
← Fig. 3c
Fig. 4
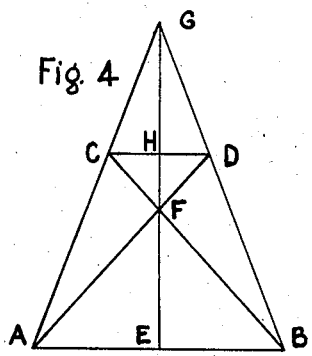
Inventor
Leon D. Isaacson Patented Mar. 20, 1945

2,371,999

UNITED STATES PATENT OFFICE 2,371,999

DEVICE FOR CREATING, TESTING, AND MEASURING STEREOPSIS

Leon D. Isaacson, Brooklyn, N. Y.

Application July 20, 1943, Serial No. 495,506

7 Claims. (Cl. 88—20)

The object of this invention is to provide an improved device for creating, testing, and measuring stereopsis, wherein:

1. The testing distance can be varied over a very wide range.
2. A single target can be used, eliminating changes in parallax due to movement of the observer's head.
3. Accurate quantitative measurement of stereopsis can be made by micrometric control of the variation in apparent parallax of the images.
4. Effort of fusion would be minimized, as all other objects in the field of vision would be fused when the test images are fused. This is in contrast to conventional stereograms, wherein diplopia with respect to other objects in the field of vision is necessary to obtain fusion of the test objects.
5. Simplicity, compactness, and ease of operation of the apparatus would be provided.
6. A normal relation between accommodation and convergence would be maintained. This is in contrast to conventional types of apparatus using stereograms, wherein the accommodation-convergence relationship is considerably changed, usually resulting in uncomfortable vision and faulty stereopsis.
7. Use of an unlimited variety of test objects would be possible.

One form of the embodiment of my invention is shown in the accompanying drawing, in which Figs. 1a and b are side elevations, in section, of two forms of a double prism, Fig. 1c is a form of triple prism, and Fig. 1d is a side elevation of one arrangement of multiple mirrors, to all of which further reference is made in the specification and claims. The dotted lines indicate the paths of typical light rays proceeding from a distant object.

Fig. 2 is a device similar to what is commonly known in the ophthalmic profession as a trial frame, in that it comprises two earpieces 1 and a nosepiece 2 for attaching the device in front of the eyes of the person being tested. Two prism holding chambers 3 are adjustably mounted on bar 4 so that one may be geometrically centered in front of the right, and the other in front of the left eye of the person being tested.

Figs. 3a, 3b, 3c illustrate retinal patterns; and Fig. 4 illustrates the geometrical principles involved.

Prism holders 5 are rotatably suspended in chambers 3, and in each holder is mounted one of two double prisms of equal power (Fig. 1a) with its common base line coinciding with the horizontal diameter of the holder. Attached to the periphery of each holder is a segment of a worm gear 6. Rotatably suspended in chambers 2 is a splined control shaft 7, and mounted thereon are two worms 8, one meshing with the right, and the other with the left prism holder worm gear. At one end of the control shaft is mounted a control knob 9, the periphery of which is a calibrated scale 10. An index mark 11 at the end of bar 4 provides a point of reference for the scale. Worms and worm gears are so cut that rotation of the control shaft will produce rotation of the two prism holders equal amounts in opposite direction. Scale 10 is calibrated to indicate the angular deviation of the prism base lines from a horizontal position.

The principle and method of operation of the apparatus are as follows. The device is adjusted before the eyes of the person being examined so that his pupils are horizontally bisected by the common base lines of the prisms, the spline in control shaft 7 permitting the distance between prism holders to be varied as required.

If the observer looks at a test object such as a spot of light, it will be imaged on each retina as two vertically separated spots, the amount of separation depending on the power of the prisms. If the common base lines of the prisms are exactly horizontal one spot will appear directly over the other on each retina, and the two retinal patterns, as shown in Fig. 3a, will be mentally fused into two equally distant spots in vertical alignment.

If now the prisms are rotated by means of control knob 9, the vertically doubled retinal images will also be rotated, causing such images to be horizontally and vertically displaced, the amount of which will be a function of the angle of rotation. However, as the prisms will rotate equal amounts in opposite directions, all the images will be displaced by equal amounts but while the vertical separation will be decreased equally on both retinae, the horizontal separation between corresponding images on both retinae will vary oppositely in amount. If the control knob is turned so that the common base line of the right prism rotates in a counter-clockwise direction (facing the observer) from a horizontal position, the upper images in the absence of fusion will appear to the observer to move further apart, and the lower images will appear to move closer together. The result will be a projected retinal pattern similar to that shown in Fig. 3b which is identical in form with the unfused projected retinal images of two spots situated at different distances from the observer. In the presence of fusion, however, the upper images will be mentally interpreted as originating from a single object located at some definite distance from the observer, while the lower images will appear to originate from a duplicate object located at a lesser distance from the observer. Likewise, rotation of the prisms in the opposite direction will produce a pattern similar to that shown in Fig. 3c, wherein, of the two stereoscopically projected "objects," that which previously appeared nearer to the observer will now appear further from him.

Obviously, the apparent distances of the "objects" from the observer can be varied in infinitely small amounts within his range of fusion, the distances being equal only when the base lines of the prisms are truly horizontal. For other positions of the prisms, use is made of calibrated scale 10 and index mark 11. As the horizontal displacement of the retinal images is a function of the power of the prisms, the distance of the actual test object, and the angle of rotation of the prisms from horizontal, it may be readily determined. Knowing these factors, and measuring the interpupillary distance of the observer, it is possible to apply the basic laws of stereoscopic projection in order to determine the apparent distances of the stereoscopically projected "objects." Referring to Fig. 4, AB represents the interpupillary distance of the observer, H is the actual test object, and CD is the horizontal separation between upper and lower images on either retina, as projected in the plane of object H (dimension b in Fig. 3c), symmetrically displaced with respect to H by rotation of the prisms. G is the position to which the observer will mentally fuse and project as a single object the images which are displaced templeward (upper images in Fig. 3b), and F is the position to which the observer will mentally fuse and project as a duplicate single object the images which are displaced nasalward (lower images in Fig. 3b). By plane geometry it can be shown that G, H, and F lie in a common vertical plane. E, taken as a point of reference in determining the apparent distances of the stereoscopically projected points F and G, is the intersection of this plane with line AB.

Let
$$AB \text{ equal } a$$
$$CD \text{ equal } b$$
$$EH \text{ equal } c$$
$$EG \text{ equal } x$$
$$EH \text{ equal } x'$$

By plane geometry:
$$\frac{a}{b} \text{ equals } \frac{x}{x-c} \text{ equals } \frac{x'}{c-x'}$$

Therefore:
$$x \text{ equals } \frac{ac}{a-b}$$

$$x' \text{ equals } \frac{ac}{a+b}$$

$$\frac{x}{x'} \text{ equals } \frac{a+b}{a-b}$$

Thus, as factors $a$, the interpupillary distance of the observer, $b$, the projected horizontal separation between upper and lower images on either retina, and $c$, the distance of the actual test object from the observer, are determinable, the values of $x$, the apparent distance from the observer of the nearer stereoscopically projected "object," $x'$, the apparent distance from the observer of the more distant stereoscopically projected "object," and $$\frac{x}{x'}$$

can be found. Obviously, tables can be prepared so that the required values can be obtained without computation on the part of the examiner.

It will be understood that the specific method and device above described may be varied within wide limits without departing from the spirit of the invention. For example, the test object, instead of being a single object, may be a multiplicity of targets situated at different distances from the observer, and the latter may be required to so adjust the prisms that the upper image of one target appears at the same distance as the lower image of another target. Similarly, the device may be constructed as a self-supported instrument through which the observer gazes, and the optical systems used for multiplying the image may be of types other than that shown in Fig. 1a. For example, any of the systems shown in Fig. 1 may be used with equal facility. Each element of the system may also be independently variable as to power and position, making it possible to so adjust the device that one image of the test object will appear to the right or to the left, as well as in front of or behind, the other image, and also making it possible to vary the relative rates of motion of the stereoscopically projected "objects."

Having attained, by means of the method and device herein set forth, the objects sought, as well as others not specifically mentioned, I claim:

1. In a device of the class described, optical means for identically multiplying each of the retinal images of a single object binocularly viewed by an observer, micrometrically controllable means for displacing corresponding images of such multiple-image patterns identically in a vertical direction and non-identically in a horizontal direction to produce retinal image patterns corresponding elements of which fall upon corresponding areas of the two retinae, and means for determining the relative positions of the elements of such multiplied retinal image patterns and their spatially projected apparent sources, substantially as herein specified.

2. In a device of the class described, prism means for identically multiplying each of the retinal images of a single object binocularly viewed by an observer, micrometrically controllable means for displacing corresponding images of such multiple-image patterns identically in a vertical direction and non-identically in a horizontal direction to produce retinal image patterns corresponding elements of which fall upon corresponding areas of the two retinae, and means for determining the relative positions of the elements of such multiplied retinal image patterns and their spatially projected apparent sources, substantially as herein specified.

3. In a device of the class described, a pair of multiple prisms, means for positioning them one in front of each eye of an observer, means for controllably orienting them with respect to the plane of the visual axes so that the images of an object binocularly viewed through them are multiplied on each retina of such observer, and so that corresponding images of such multiple-image patterns are displaced identically in a vertical direction and non-identically in a horizontal direction, and means for determining the relative positions of such multiplied retinal images and their spatially projected apparent sources, substantially as herein specified.

4. In a device of the class described, a like pair of micrometrically controlled rotatable multiple prisms, means for symmetrically positioning them one in front of each eye of an observer viewing an object, means for rotating said prisms equal amounts in opposite directions to cause corresponding elements of the multiple retinal image patterns formed by refraction of light from said object through said prisms to fall upon corresponding areas of the two retinae of said observer, and means for determining the relative positions of said elements and their spatially projected apparent sources, substantially as herein specified.

5. In a device of the class described, mirror means for identically multiplying each of the retinal images of a single object binocularly viewed by an observer, micrometrically controllable means for displacing corresponding images of such multiple-image patterns identically in a vertical direction and non-identically in a horizontal direction to produce retinal image patterns corresponding elements of which fall upon corresponding areas of the two retinae, and means for determining the relative positions of the elements of such multiplied retinal image patterns and their spatially projected apparent sources, substantially as herein specified.

6. In a device of the class described, a pair of multiple mirrors, means for positioning them one in front of each eye of an observer, means for controllably orienting them with respect to the plane of the visual axes so that the images of an object binocularly viewed by reflection from them are multiplied on each retina of such observer, and so that corresponding images of such multiple-image patterns are displaced identically in a vertical direction and non-identically in a horizontal direction, and means for determining the relative positions of such multiplied retinal images and their spatially projected apparent sources, substantially as herein specified.

7. In a device of the class described, a like pair of micrometrically controlled rotatable multiple mirrors, means for symmetrically positioning them one in front of each eye of an observer viewing an object, means for rotating said mirrors equal amounts in opposite directions to cause corresponding elements of the multiple retinal image patterns formed by reflection of light from said object by said mirrors to fall upon corresponding areas of the two retinae of said observer, and means for determining the relative positions of said elements and their spatially projected apparent sources, substantially as herein specified.

LEON D. ISAACSON.